(12) United States Patent
Coulthard et al.

(10) Patent No.: US 7,617,222 B2
(45) Date of Patent: Nov. 10, 2009

(54) TRANSFERRING DATA AND STORING METADATA ACROSS A NETWORK

(75) Inventors: Phil Coulthard, Aurora (CA); David Dykstal, Rochester, MN (US); George Voutsinas, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 1525 days.

(21) Appl. No.: 10/286,560

(22) Filed: Oct. 31, 2002

(65) Prior Publication Data

US 2004/0003013 A1   Jan. 1, 2004

(30) Foreign Application Priority Data

Jun. 26, 2002   (CA) .................................. 2391717

(51) Int. Cl.
*G06F 17/00* (2006.01)
*G06F 17/30* (2006.01)
*G06F 9/44* (2006.01)

(52) U.S. Cl. ..................... 707/100; 707/1; 707/102; 707/200; 707/205; 717/169

(58) Field of Classification Search ................ 707/1–3, 707/5, 10, 100–104.1, 200–206; 715/501.1, 715/512–513, 200–202; 709/203–210, 215–225; 717/162–167, 169–170

See application file for complete search history.

(56) References Cited

U.S. PATENT DOCUMENTS

| | | | |
|---|---|---|---|
| 4,015,242 A | | 3/1977 | Anceau et al. |
| 5,027,271 A | * | 6/1991 | Curley et al. ................ 710/240 |
| 5,265,244 A | | 11/1993 | Ghosh et al. |
| 5,359,725 A | | 10/1994 | Garcia et al. |
| 5,471,615 A | * | 11/1995 | Amatsu et al. .............. 709/202 |

(Continued)

FOREIGN PATENT DOCUMENTS

EP   0684541 A2   11/1995

(Continued)

OTHER PUBLICATIONS

Spazio technologies, Spazio FMT (file/message transfomer), General information manual, EMAMQX030/01, Mar. 2001, 24 pages.*

(Continued)

*Primary Examiner*—Srirama Channavajjala
(74) *Attorney, Agent, or Firm*—Libby Z. Hardelsman

(57) ABSTRACT

Data is now able to be transferred back and forth between computer systems which have disparate file systems, e.g., between a computer having a hierarchical file system and a computer having a nonhierarchical file system. The differences, however, are not limited to the file storage system. Data may now be transferred across different platforms, different human and computer languages, different binary codes, etc. From one computer system the associated metadata is stored in a interpretable format on the second computer system so that when data and its associated metadata are transferred, the second computer system can interpret the transferred data. Data transfer can be accomplished in both directions. Thus, a tool writer or a software developer using a integrated development environment, such as Eclipse, on a Linux workstation with its hierarchical file system may download source files and other resources from an iSeries computer server with its OS/400 nonhierarchical file system, modify the resources, and then put them back onto the iSeries machine for use on the iSeries. The metadata of the source file and other resources are stored in a .properties file which, if in XML format, supports the transfer of resources across the Internet.

15 Claims, 7 Drawing Sheets

U.S. PATENT DOCUMENTS

| | | | |
|---|---|---|---|
| 5,664,177 A | | 9/1997 | Lowry |
| 5,666,553 A | * | 9/1997 | Crozier .................. 715/540 |
| 5,673,403 A | * | 9/1997 | Brown et al. ............. 715/744 |
| 5,732,219 A | | 3/1998 | Blumer et al. |
| 5,884,078 A | | 3/1999 | Faustini |
| 5,913,063 A | | 6/1999 | McGurrin et al. |
| 5,913,065 A | | 6/1999 | Faustini |
| 5,956,715 A | * | 9/1999 | Glasser et al. ............. 707/9 |
| 5,987,506 A | * | 11/1999 | Carter et al. ............. 709/213 |
| 6,041,179 A | | 3/2000 | Bacon et al. |
| 6,044,398 A | | 3/2000 | Marullo et al. |
| 6,085,228 A | | 7/2000 | Tharakan |
| 6,098,072 A | | 8/2000 | Sluiman et al. |
| 6,139,198 A | | 10/2000 | Danforth et al. |
| 6,141,792 A | | 10/2000 | Acker et al. |
| 6,151,609 A | | 11/2000 | Truong |
| 6,158,044 A | | 12/2000 | Tibbetts |
| 6,195,794 B1 | | 2/2001 | Buxton |
| 6,233,731 B1 | * | 5/2001 | Bond et al. ............. 717/138 |
| 6,269,480 B1 | * | 7/2001 | Curtis ................. 717/106 |
| 6,289,488 B1 | | 9/2001 | Dave et al. |
| 6,324,581 B1 | * | 11/2001 | Xu et al. .............. 709/229 |
| 6,336,120 B1 | | 1/2002 | Noddings et al. |
| 6,345,288 B1 | * | 2/2002 | Reed et al. ............. 709/201 |
| 6,570,593 B1 | * | 5/2003 | Bowers et al. ........... 715/775 |
| 6,665,689 B2 | * | 12/2003 | Muhlestein ............. 707/204 |
| 6,671,772 B1 | * | 12/2003 | Cousins ................ 711/112 |
| 6,684,222 B1 | * | 1/2004 | Cornelius et al. ........ 707/104.1 |
| 6,732,095 B1 | * | 5/2004 | Warshavsky et al. ........ 707/5 |
| 6,854,035 B2 | * | 2/2005 | Dunham et al. .......... 711/117 |
| 2002/0032691 A1 | * | 3/2002 | Rabii et al. ............ 707/200 |
| 2002/0161850 A1 | * | 10/2002 | Ulrich et al. ........... 709/214 |
| 2002/0188667 A1 | * | 12/2002 | Kirnos ................ 709/203 |
| 2003/0046366 A1 | * | 3/2003 | Pardikar et al. .......... 709/219 |
| 2003/0158836 A1 | * | 8/2003 | Venkatesh et al. .......... 707/1 |
| 2003/0222918 A1 | | 12/2003 | Coulthard et al. |
| 2004/0205581 A1 | * | 10/2004 | Gava ................. 715/513 |

FOREIGN PATENT DOCUMENTS

| | | | | |
|---|---|---|---|---|
| EP | 0955580 A1 | * | 11/1999 | ............. 9/44 |
| EP | 1126369 A2 | * | 8/2001 | ............. 9/445 |
| EP | 1447756 A1 | * | 8/2004 | ............. 17/30 |
| GB | 2321981 A | * | 8/1998 | ............. 9/445 |
| GB | 2333868 A | * | 8/1999 | ............. 29/6 |
| GB | 2366050 A | * | 2/2002 | ............. 11/34 |
| GB | 2400211 A | * | 10/2004 | ............. 9/455 |
| JP | 9244837 A | | 9/1997 | |
| WO | WO 99/46672 | * | 9/1999 | ............. 3/14 |

OTHER PUBLICATIONS

Staffan Bjork, "Hierarchical flip zooming: enabling parallel exploration of hierarchical visualizations", no date, 20 paages.*

Stuart Sechrest et al. "Blending hierarchical and attribute-based file naming", IEEE 1992, pp. 572-580.*

Dave Paulsen, "a non-hierarchical model of consciousness", 1991 3 pages.*

Edgar H Sibey et al. "A data definition and mapping language", Communication of the ACM, vol. 16, No. 12, Dec. 1973, pp. 750-759.*

Daniel J Dailey et al. "A self-describing data transfer model for ITS applications", IEEE transactions on intelligent transportation systems, vol. 3, No. 4, Dec. 2002, pp. 293-300.*

Toggleable Widget For A User Interface, Phil Coulthard et al., filed Oct. 31, 2002, U.S. Appl. No. 10/285,996.

Editing Files of Remote Systems Using an Integrated Development Environment, Kushal s. Munir et al. filed Oct. 31, 2002, U.S. Appl. No. 10/285,996.

Dynamic Generic Framework for Distributed Tooling, Dave McKnight, filed Apr. 29, 2002, U.S. Appl. No. 10/134,190.

Framework To Access A Remote System From An Integrated Development, Phil, Coulthard et al., filed Oct. 31, 2002, U.S. Appl. No. 10/286,559.

Accessing A Remote Iseries or AS/400 Computer System From An Integrated Development Environment, Phil Coulthard et al., filed Oct. 31, 2002, U.S. Appl. No. 10/285,993.

* cited by examiner

TRANSFERRING DATA AND STORING METADATA ACROSS A NETWORK

RELATED APPLICATIONS

This application is related to pending Canadian Patent Application No. CA2360645 filed 31 Oct. 2001; pending Canadian Patent Application No. CA2388150 filed 29 May 2002; pending Canadian Patent Application No. CA2391719 filed Jun. 26, 2002; pending Canadian Patent Application No. CA2391756 filed Jun. 26, 2002; and pending Canadian Patent Application No. CA2391733 filed Jun. 26, 2002, which are hereby incorporated by reference in their entireties.

TECHNICAL FIELD

This invention relates generally to the field of the development of computer applications, and more particularly, relates to a method to transfer files from a computer operating system to another computer operating system wherein the two computer operating systems are different and have different file structures.

BACKGROUND OF THE INVENTION

At the simplest level, an operating system not only manages the hardware and software resources of a computer system, but the operating system also provides a stable, consistent way for applications to deal with the hardware without having to know all the details of the hardware. The first task, managing the hardware and software resources, is important because as computer processor frequencies and as bus frequencies and traffic increases, many programs and input methods compete for the attention of the central processing unit (CPU) and demand memory, storage and input/output (I/O) bandwidth for their own purposes. In this capacity, the operating system manages the processor so each application gets its necessary resources, ensures all applications are compatible, and, at the same time, allocates the limited capacity of the system to the greatest good of all the users and applications.

The second task, providing a consistent application interface, is especially important if there is more than one type of computer using the operating system or if the hardware of the computer ever changes. A consistent application program interface (API) allows a software developer to write an application on one computer and be confident that it will run on another computer of the same type, even if the quantity of memory is different on the two machines. An operating system can ensure that applications continue to run when hardware upgrades and updates occur because the operating system, not the application, manages the hardware and the distribution of its resources.

Operating systems may be categorized into four types based on the computers they control and the supported applications. The broad categories are: (1) real-time operating system (RTOS); (2) single-user single-task operating systems; (3) single-user multitasking operating system; and (4) multi-user operating system. Real time operating systems (RTOS) are specifically designed to manage the computer so that a particular operation executes in real-time in precisely the same way every time. RTOSs are grouped according to an acceptable response time, whether it be seconds, milliseconds, microseconds, and according to whether or not failure of the system can cause death. RTOS systems are used to control medical systems, machinery, scientific instruments and industrial systems. An RTOS typically has little or no user-interface capability and no end-user utilities; a RTOS will be a sealed box when delivered for use. Embedded systems are combinations of processors and special software inside another device, such as the electronic ignition system on cars.

As the name implies, the next category of operating systems, the single-user, single task operating system is much smaller and less capable to fit into the limited memory of handheld device and manage resources so that one user can effectively do one thing at a time. The Palm OS for Palm handheld computers is a good example of a modem single-user, single-task operating system, also called handheld operating systems.

A single-user, multitasking operating system is what most people use on their desktop and laptop computers today. OS/2, Windows, and the MacOS are examples of an operating system that allow a single user to have several programs in operation at the same time. Workstations are more powerful versions of personal computers and while only one person typically uses a particular workstation, workstations often run a more powerful version of a desktop operating system and often have software associated with larger computer systems because of the more powerful hardware. Often times, software programmers will install an integrated development environment on a workstation to develop new applications.

A multi-user operating system allows many different users to simultaneously take advantage of one computer's resources. Servers are computers or groups of computers used for internet serving, intranet serving, print serving, file serving, and/or application serving. Servers are also sometimes used as mainframe replacements. The multi-user operating system for these servers and other mainframe computers must balance the requirements of the various users are balanced to ensure that each program and each computer, called clients, accessing the server have sufficient and separate resources so that a problem with one user doesn't affect the entire community of users.

One way an operating system knows about the data in the computer is through the use of metadata. Metadata is data about data and is distinct from the data itself. Within the computer industry, the most common domain of metadata is the file system. Files contain data which has associated metadata. Metadata may be immutable or independent, and metadata may further be essential or nonessential. Immutable metadata changes only when the data itself changes. Independent metadata may change regardless of whether the data in the file also changes; for instance, changing the number of permissible users or changing a file's location does not necessarily change the actual data within the file. Creation date and possibly the last access data, assuming read-only access, also may change without changing the data. Independent metadata is the most common type of metadata, though not necessarily the most important type of metadata. Essential metadata is required to access a file, vis a vis a file's name, location, and size are essential metadata because the file cannot be used without them. Nonessential metadata is that metadata which is not necessary to access the file, i.e., a file can exist in a traditional hierarchical file system in a useful manner without these pieces of metadata. Examples of nonessential metadata are the file's dates and the permissions or permissible users.

The operating system may manipulate a file's contents if it can find and access the file's name and the file's location. This essential metadata may be a combination of the host, disk, and directory structure where the file is located. A file may be uniquely selected by combining the file's name and the file's location into a single identifier, often called the path to the file.

In a hierarchical file system, the combination of the file's name and location is the file's identifier. File names and locations vary only length and possibly encoding, whether in American National Standard Code for Information Interchange (ASCII), Unicode, MacRoman, Extended Binary-coded Decimal Interchange Code (EBCDIC), etc.

The file has a size, even if it is zero, and the size of the file is essential metadata. File size is stored in sizes of memory, i.e., blocks, bytes, or bits. The extent of the file is often stored in the basic file system structures in the form of the starting and ending points of the file plus the path from one to the other usually in the form of pointers between blocks of memory. Implementations vary, however, and at times the file size metadata is stored in a distinct location. Other implementations may store the end points.

File dates are nonessential metadata; there are many dates to associate with a file: creation date, date of last data modification, date of last metadata modification, date of last data access, etc. Modification date is immutable metadata.

The nature of the file's data is immutable metadata and refers to the file's content type or type, such as whether the file is executable, image, audio, video, text, etc. and/or specific file formats such as JPEG, AIFF, MPEG2, Microsoft Word, etc., or even very specific versions of particular formats. A file's type, by definition, cannot change unless the data itself also changes. One case where immutable metadata may change without requiring a change to the data itself is a change, either an increase or decrease of the file's accuracy. For example, a file may have associated file type metadata that identifies it as a GIF image. At some point in the future, it may become known that the file is actually an interlaced GIF89a. Similarly, a file's modification date may be increased to millisecond accuracy. File type metadata is nonessential if the file's data can be retrieved and stored without knowledge of the file type metadata.

Early operating systems displayed file type metadata exactly as it was stored, such as with a handful of characters like TXT or COM. Remembering that TXT means text file was easy. Displaying file type metadata as stored, moreover, saved memory and effort from the CPU and the programmer. This file type metadata storage remained distinct but the information was displayed in its raw form. Subsequent operating systems incorporated file type metadata within the file identifier. In order to specify a file completely, it was necessary to provide the file's location, its name, and its type which meant that several files could share the same name and location, provided they had different types. Thus, file name extensions were born. Although the application itself may only need the file's data, choosing which application to use depends on the file's type, format, content type. For instance, the file may be an image file or an audio file and the user may be required to select the appropriate application herself, by e.g. opening the file from within an application. Broad file types like image or audio are useful for organizational purposes, but when it comes down to an application reading a file's data and correctly interpreting it, more specific file type metadata such as JPEG or WAV becomes necessary. Thus, not only the file type but the particular application must be available to the user if she/he is going to open and/or edit the file. The process of choosing which application to use to manipulate a particular file, called application binding, can be handled by the operating system. The user simply indicates his desire to open a file by double-clicking the file and the operating system looks at the file's type and chooses an appropriate application.

Metadata also includes file permissions which inform the operating system and the user who can read this file, who can write to the file, who can execute the file, etc. Permissions and ownership metadata are nonessential and are determined by the security model of the operating system: user/group id numbers, permission bit masks, access control lists, etc. Permissions are usually stored on file systems that are meant to be used with networked and/or multi-user operating systems. Because file date storage is so common, there is almost always a logical home for permissions to be stored with the file dates in the dedicated metadata structures of the file system. File ownership usually accompanies file permissions. Unix, for example, traditionally regulates file access by assigning rights to the file's owner, the file's group, and everyone else. In such an implementation, the permissions metadata is useless without the owner and group metadata.

Some immutable metadata, e.g., size, are woven into the fabric of the file system whereas other metadata, e.g., modification date, may be stored in the dedicated metadata structures of the file system. Independent, non-essential metadata such as file permissions, creation date, etc. have also been stored in the dedicated metadata area. In the earliest implementations of file systems that stored file type metadata, metadata was stored, like all other metadata, in a distinct, but usually very small file system structure.

Like all forms of information, metadata is easy to remove or ignore, but it is often difficult or impossible to add once it is lost. If a user no longer knows when a file was last modified, she/he cannot recover that piece of information despite the fact that the modification date is immutable metadata completely tied to the data itself. The data itself remains, but the information about the data is lost. To truly lose file size metadata, the file's extent must be lost. Thus, the extent combined with the traversal path is the actual storage mechanism for the size metadata.

The first step in any implementation of metadata is to decide how the metadata will be stored. A file's location may be stored in a distributed hierarchical manner, with each directory storing a list of all the items it contains. In order to access the file in a hierarchical file system, a user must already know the location of the file. From that point, a user may drill down the directory tree or drill up to the directory path that leads from the file to the file system root. In most common file system implementations, you must already know a file's name in order to read that piece of metadata.

Different from hierarchical file systems which use two pieces of information, name and location, as an identifier, nonhierarchical file and database designs use a single value by which a row in a table can be uniquely selected. This concept of a single, unique identifier is common in the world of relational databases and nonhierarchical file systems.

The core operating system functions, i.e., the management of the computer system, lie in the kernel of the operating system. The display manager is separate, though it may be inextricably tied to the kernel. The ties between the operating-system kernel and the user interface, utilities and other software define many of the differences in operating systems. Application program interfaces (APIs) let application programmers use functions of the computer and operating system without having to directly keep track of all the details in the CPU's operation. For example, if a user is permitted to specify the name of a newly created file, the operating system might provide an API function named MakeFile for creating files. When writing the program, the programmer would insert the instruction MakeFile [1, %Name, 2]. This instruction tells the operating system to create a file that allows random access to its data 1, has the name %Name entered by the user, and has a size 2 that varies with the data is stored in the file. The operating system sends a query to the disk drive to get the location of the first available free storage location and creates an entry in the file system of the file's metadata, i.e., the beginning and ending locations of the file, the name of the file, the file type, whether the file has been archived, which users have permission to look at or modify the file, and the date and time of the file's creation, etc. The operating system writes the file identifier at the beginning of the file, sets up the permissions, and includes other information that ties the file to the application. In all of this information, the queries to the disk drive and addresses of the beginning and ending point of the file are in formats heavily dependent on the manufacturer and model of the disk drive but because of the API for disk storage, the programmer need not know the instruction codes, data types, and response codes for every possible hard disk and tape drive. The operating system, connected to drivers for the various hardware subsystems, manages the changing details of the hardware; the programmer simply writes code for the API and trusts the operating system to do the rest.

Just as the API provides a consistent way for applications to use the resources of the computer system, a user interface (UI) brings structure to the interaction between a user and the computer. In the last decade, almost all development in user interfaces has been in the area of the graphical user interface (GUI). There are other user interfaces, some graphical and some not, for other operating systems. Unix, for example, has user interfaces called shells that are more flexible and powerful than the standard operating system text-based interface. Programs such as the Korn Shell and the C Shell are text-based interfaces that add important utilities but their main purpose is to make it easier for the user to manipulate the functions of the operating system. There are also graphical user interfaces, such as X-Windows and Gnome, that make Unix and Linux more like Windows and Macintosh computers from the user's point of view. It's important to remember that in all of these examples, the user interface is a program or set of programs that sits as a layer above the operating system itself.

While some definitions have been presented in context herein, a tutorial in additional definitions may be helpful. An application is a software program used by an end user; examples of applications include a scheduling client program or application wherein a person may schedule employees' work days; a word processing application; a presentation application to prepare slides for a talk; a database application in which to manipulate data; a spreadsheet application, etc. A tool is a software application that enables a software developer to write additional applications. Examples of tools include: a remote-accessing tool; a database tool to access and manipulate remote relational database tables, columns and rows; a message queue tool to access and manipulate remote message queues; an import tool to select files on a remote system for importing into an ongoing software development project; a performance tool to access and configure remote performance; a tracing tool to trace execution of remote performance, a file tool to access folders and files in the file system of a remote system, etc. A component is software code that can be reused across multiple applications; in other words, a component is standard software that can be pulled off a server and incorporated into new applications using a tool by software developers. For example, a calendar component may be used in several applications such as a scheduling application, a presentation application, a data base application to calculate employee's vacation and pay, etc. Thus, a software developer uses tools to pull components from a local or remote server to create applications.

Software developers found it was first convenient and then necessary to have all code generation tools under one umbrella, called an integrated development environment (IDE). Integrated development environments, as the name suggests, give the software engineer an environment wherein the appropriate tools needed for source code editing, compiling, linking, testing, debugging, and profiling are seamlessly integrated. The advantage of using an integrated development environment is that the software developer need not be concerned about the tool interfaces when moving from one phase of code development to the other. Typically the integrated development environment tracks the phase of code generation and invokes the necessary tool. Currently, Eclipse, one integrated development environment, provides edit support for local files that exist in the user's workspace. For programmers, however, who develop programs for remote servers, there is a need to be able to access files that may not exist locally on their machine. In a client/server environment, software developers need to edit source code in real-time wherein that code very often resides on remote machines. In other words, software developers want to open, edit, and save remote files as if those files existed on their local machine, without having to manually transfer files between their workstation and the server. For computer software programmers using an IDE such as Eclipse and for persons writing IDE tools for application development on different operating systems, there is a need to remotely access, query, and/or manipulate resources on nonhierarchical operating systems using an IDE on a hierarchical operating system for development tasks.

Thus, there is a need within the software development industry to access and transfer resources on remote servers and other computers across a network. The remote servers and other computers, moreover, may have different operating systems and file structures, for instance, a client upon which an IDE, such as Eclipse, is installed, has a hierarchical file system using ASCII to represent and store characters whereas the server or large mainframe for which applications are being written, may have a nonhierarchical file system using, for instance, EBCDIC to represent and store characters. The differences between the two file systems and binary code representations force users and tool writers to maintain source code on the server or the large mainframe system.

Software configuration management encompasses the techniques of initiating, evaluating, and controlling change to software products, during and after the development process. Thus, software configuration management is an integral part of the software development process across all phases of the software's life cycle. A partial list of software configuration management chores include the identification, change reporting and evaluation, change execution, tool evaluation and use, version control, and management principles relation to configuration control. Software configuration management (SCM) repositories can be used to store, version and manage the resources and projects. Right now, each software configuration management product requires a specific adaptor.

There is thus a need in the industry to allow any hierarchical based tool to accurately accommodate nonhierarchical operating system source files. There is a further need in the industry to have a single software configuration manager which manages code for both hierarchical and nonhierarchical operating systems. Thus, given an IDE, the software configuration management should provide only one repository that runs on the server operating system to manage the development of software for that server.

SUMMARY OF THE INVENTION

These needs and others are satisfied by a method to transfer data from a first computer to a second computer, the first and second computer having disparate file structures, each of the file structures characterized by its metadata, the method comprising the steps of: listing a data structure of the data to be transferred from the first computer; scanning the metadata of the data structure to be transferred; storing the metadata in a .properties file; creating a corresponding data structure of the data structure in the second computer; translating the metadata in the .properties file to corresponding metadata in the second computer; transferring the data; and converting the data in the data structure of the first computer to a usable format in the corresponding data structure in the second computer using the corresponding metadata. The data structure of the first computer is a file which may be from a nonhierarchical file system and the data is within at least one member of the file, and the corresponding data structure in the second computer may be a folder and the transferred data in a file, the second computer having a hierarchical file structure. In another instance, the first computer may have a hierarchical file structure wherein the data structure of the first computer might be a folder and the data within at least one file, and the corresponding data structure in the second computer is a file and the transferred data is in a member, the second computer having a nonhierarchical file structure. In any event, the data structure of the first computer is different than the corresponding data structure in the second computer, the metadata representing the differences in the data structures so that the first computer and the second computer may both have hierarchical file structures, or the first computer and the second computer may have nonhierarchical file structures. It is intended that all the files of a folder in a hierarchical file structure have the same values of metadata. It is further contemplated that all the members of a file in a nonhierarchical file structure have the same values of metadata. The metadata may include at least one of the following: binary code format, human language, computer language, permissions, dates.

The .properties file may be located on a third computer connected to a network to which the first and the second computers are connected. The hierarchical file system may be on a Linux operating system and/or may be on a Windows operating system. The nonhierarchical file system may be on an OS/400 operating system and/or on an OS/390 operating system. To and from these systems, the data may be pushed, pulled, imported, released, and/or caught up between the first computer and the second computer across a network.

The invention may further be considered a method by which to transfer data across a network, comprising reading metadata of the data on a first computer system and storing the metadata on a second computer system and then converting the data from the first computer to usable data on the second computer by applying the stored metadata. The metadata may be stored in an XML file on the second computer. The metadata may also be stored on a third computer connected to a network connecting the first and second computers.

The invention may also be a computer processing device, comprising: a processor; a memory functionally connected to the processor, the memory having a first file structure; a network interface by which the processor can access one or more remote systems across a connected or wireless network, the one or more remote systems having a second file structure; an application within the memory needing data having the second file structure, and a properties file in the memory, the properties file having attributes of the second file structure for use in converting the data to the first file structure.

The invention is also an article of manufacture, comprising a data storage medium tangibly embodying a program of machine readable instructions executable by an electronic processing apparatus to perform method steps for operating an electronic processing apparatus, said method steps comprising the steps of: obtaining a data structure and its associated metadata from a first operating system; converting the associated metadata into a .properties file; and using the .properties files, creating a second data structure with its second associated metadata on a second operating system. The method steps of the article of manufacture may further include transferring data having the data structure from the first operating system to the second operating system; and storing the transferred data in the second data structure usable by the second operating system.

The invention is also a computer processing system, comprising: a processor under the operation of a first operating system; a memory connected to the processor wherein data is stored in a data structure accessible by the first operating system; a network interface connected to the processor by which the processor can receive input data; and the received input data being converted from a second operating system using a metadata properties files to convert the input data to the data structure. The second operating system may be on a second computer processing system. The memory may be connected to the processor across at least one network. The metadata properties files may be located on a third computer processing system connected to the computer processing system and the second computer processing system. The memory may be on a fourth computer processing system connected to the computer processing system and the second computer processing system and the third computer processing system across the at least one network.

Last, but not least, the invention may also be a computer file transfer mechanism, comprising: means for reading a first data structure on a first operating system; means for creating a .properties file having metadata of the first data structure; means for transferring the .properties file; means for creating a second data structure on a second operating system from the .properties file; and means for transferring data having the first data structure to the second data structure. The means for transferring the .properties file may be connected to the Internet, a local area network, and/or a wide area network and a transfer of the data occurs across the respective network. The .properties file may be in XML format.

BRIEF DESCRIPTION OF THE DRAWING

Additional features and advantages of the invention will further be described below with regard to the Drawing, wherein.

DETAILED DESCRIPTION OF THE INVENTION

Figure 1:
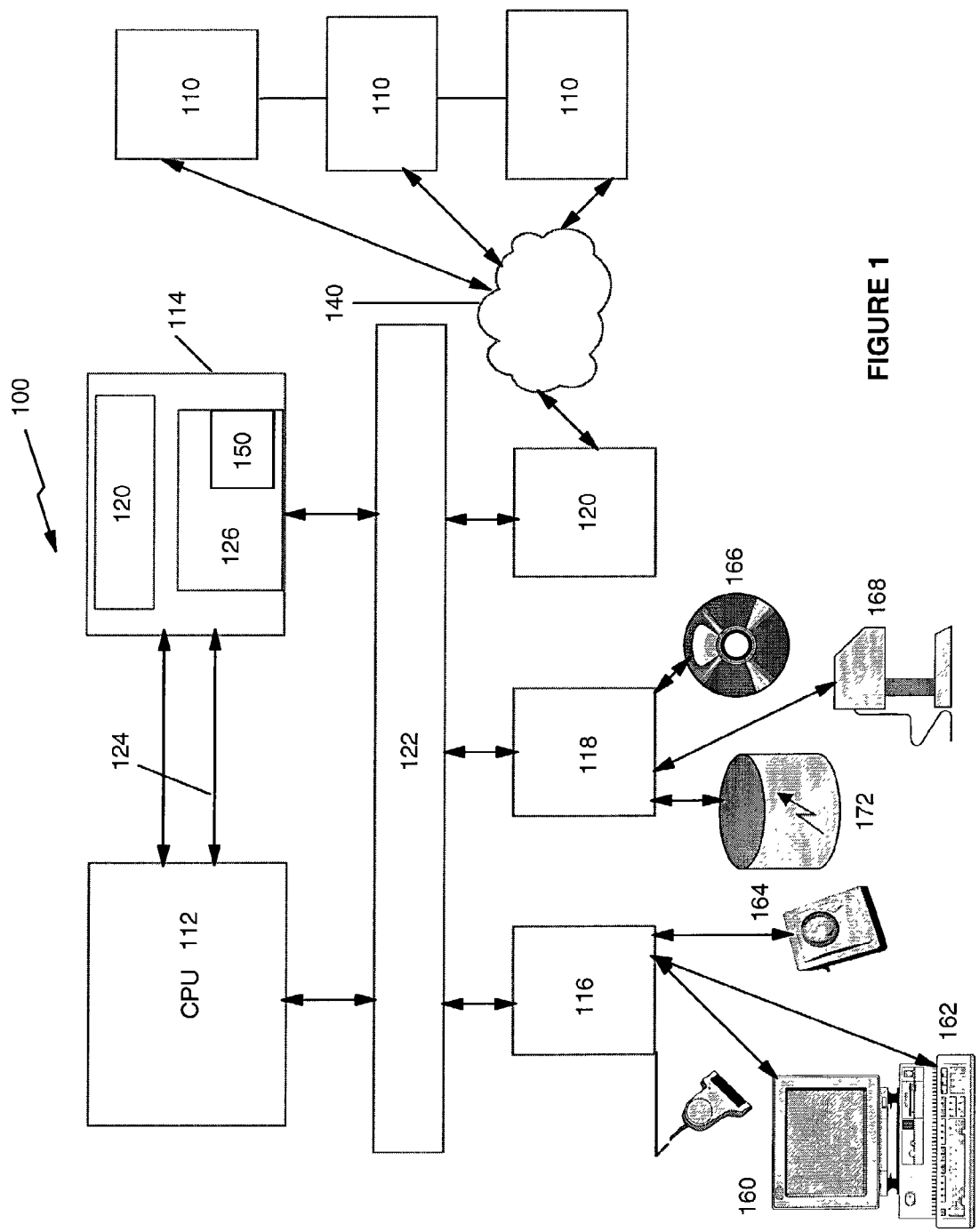
FIG. 1 is simplified representation of a computer network to which computers having hierarchical and nonhierarchical file systems are connected.

Referring to the Drawing, wherein like numbers denote like parts throughout the several views, FIG. 1 shows a highlevel block diagram of a computer network system 100, consistent with an embodiment of the invention. Computer network system 100 may comprise any number of networked computers 110, each of which may have a central processing unit (CPU) 112, main memory 114, terminal interface 116, data storage interface 118, and a network interface 120. The various devices communicate with each other via internal communications bus 122. CPU 112 is a general-purpose programmable processor, executing instructions stored in memory 114; while a single CPU is shown in FIG. 1, it should be understood that computer systems having multiple CPUs could be used. Communications bus 122 supports transfer of data, commands and other information between different devices, and while shown in simplified form as a single bus, it is typically structured as multiple buses including an internal bus 124 which may connect the CPU 112 with memory 114.

Memory 114 is a random-access semiconductor memory for storing data and programs; memory 114 is shown conceptually as a single monolithic entity but it is well known that memory is often arranged in a hierarchy of caches and other memory devices, some or all of which may be integrated into the same semiconductor substrate as the CPU 112. Random access memory (RAM) devices comprising the main storage of computer, as well as any supplemental levels of memory, e.g., cache memories, nonvolatile or backup memories, programmable or flash memories, read-only memories, etc. In addition, memory 114 may be considered to include memory storage physically located elsewhere in computer, e.g., a cache memory in a processor or other storage capacity used as a virtual memory, e.g., as stored on a mass storage device or on another computer coupled to computer via network.

Operating system 120 and applications 126 reside in memory 114. Operating system 120 provides, inter alia, functions such as device interfaces, management of memory pages, management of multiple tasks, etc. as is known in the art. Examples of such operating systems may include Linux, Aix, Unix, Windows-based, OS/400, an RTOS, a handheld operating system, etc. On iSeries and AS/400 machines, OS/400 is the native operating system and file system and IFS is the Unix file system complemented by the Qshell Unix command shell. These and other various applications, components, programs, objects, modules, etc. may also execute on one or more processors in another computer coupled to computer 110 via a network 140, e.g., in a distributed or client-server computing environment, whereby the processing required to implement the functions of a computer program may be allocated to multiple computers 110 over a network 140. Indeed, the invention is equally applicable to any microprocessor device having an operating system as described in the background of the invention in which the microprocessor or processing device is connected across a network to devices having the same or different operating systems. In general, the routines executed to implement the embodiments of the invention, whether implemented as part of an operating system or a specific application, component, program, object, module or sequence of instructions will be referred to herein as computer programs or simply programs. The computer programs typically comprise one or more instructions that are resident at various times in various memory and storage devices in a computer, and that, when read and executed by one or more processors in a computer, cause that computer to perform the steps necessary to execute steps or elements embodying the various aspects of the invention. Applications 126 may include integrated development environments 150 and if a server software application is included, network interface 120 may interact with the server software application to enable computer system 110 to be a network server.

It should be appreciated that computer 110 typically includes suitable analog and/or digital interfaces 116, 118, 120 between CPU 112 and the attached components as is known in the art. For instance, computer 110 typically receives a number of inputs and outputs for communicating information externally. For interface with a user or operator, computer 110 typically includes one or more user input devices 160-164, e.g., a keyboard, a mouse, a trackball, a joystick, a touchpad, and/or a microphone, among others, and a display such as a CRT monitor, an LCD display panel, and/or a speaker, among others. It should be appreciated, however, that with some implementations of computer 110, e.g., some server implementations, direct user input and output may not be supported by the computer. Terminal interface 118 may support the attachment of single or multiple terminals and may be implemented as one or multiple electronic circuit cards or other units. Data storage 172 preferably comprises one or more rotating magnetic hard disk drive units, although other types of data storage, including a tape or optical driver, could be used. For additional storage, computer 110 may also include one or more mass storage devices 166 and 172, e.g., a floppy or other removable disk drive, a hard disk drive, a direct access storage device (DASD), an optical drive e.g., a compact disk (CD) drive, a digital video disk (DVD) drive, etc., and/or a tape drive, among others.

Furthermore, computer 110 may include an interface 120 with one or more networks 140 to permit the communication of information with other computers 110 coupled to the network 140. Network interface 120 provides a physical connection for transmission of data to and from a network 140. The network may be the Internet but the network could also be any smaller self-contained network such as an Intranet, a wide area network (WAN), a local area network (LAN), or other internal or external network using, e.g., telephone transmissions lines, satellites, fiber optics, T1 lines, public cable, etc. and any various available technologies. Computer system and remote systems 110 may be desktop or personal computers, workstations, a minicomputer, a midrange computer, a mainframe computer. Any number of computers and other microprocessor devices, such as personal handheld computers, personal digital assistants, wireless telephones, etc., which may not necessarily have full information handling capacity as the large mainframe servers, may also be networked through network 140.

While the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of signal bearing media used to actually carry out the distribution. Examples of signal bearing media include but are not limited to recordable type media such as volatile and nonvolatile memory devices, floppy and other removable disks, hard disk drives, optical disks, e.g., CD-ROM's, DVD's, etc., among others, and transmission type media such as digital and analog communication links. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature. The illustrated embodiments are not intended to limit the present invention. Indeed, those skilled in the art will recognize that other alternative hardware and/or software embodiments may be used without departing from the scope of the invention.

CDRA is the abbreviation for Character Data Representation Architecture, a methodology for describing character data and certain control characters on any computer system, whether it is in ASCII, EBCDIC, single-byte, double-byte, or multiple-byte representation. CDRA fully describes the character sets and code pages registered and used throughout the world, and provides a means of simplifying the description and identification of these conventions. Whenever textual (character) data is transferred across a network between computers or other information handling systems, it is represented at the machine internal level by binary code. Without a doubt, this binary codes varies across computer platforms and international languages. This can complicate how computer systems work together, especially in client/server scenarios where computer platforms are different, and in international network communications with multi-language configurations, where countries use different code pages. To help ensure that character data is correctly represented and, if necessary, converted when you move data across computer platforms and international languages, CDRA may be used. A set of callable application programming interfaces (APIs) implement national language support and facilitate application development, portability, and use across multiple operating systems. The CDRA APIs can be used for handling character data conversion of single-byte character sets, double-byte character sets, multi-byte character sets, and the Unicode character set. A distributed data management (DDM) attribute called the Coded Character Set Identifier (CCSID) identifies the encoding scheme, character set, and code page used by a file. For example, if a file has a CCSID of 437, it is in USA ASCII format; if a file has a CCSID of 297, it is in the French EBCDIC format. The meaning of each CCSID is defined in the Character Data Representation Architecture. The CCSID attribute can be set locally or remotely. Setting the CCSID attribute identifies but does not convert the character set used by the file. Using CCSIDs and its APIs, data exchanged between computer systems across a variety of platforms can be represented correctly.

The disclosure herein and the referenced applications refer to remote resources. This paragraph will discuss the resources available the remote application and whose transfer to the remote application is possible with use of the techniques and apparati disclosed herein. These remote system resources include, but are not limited to: databases, files and members, programs, commands, both keyed and sequential data queues, server print resources, messages, message queues and message files, user and groups and user spaces, various kinds of data areas, e.g., character, decimal, local, logical, system values and network attributes and system status information.

Figure 2:
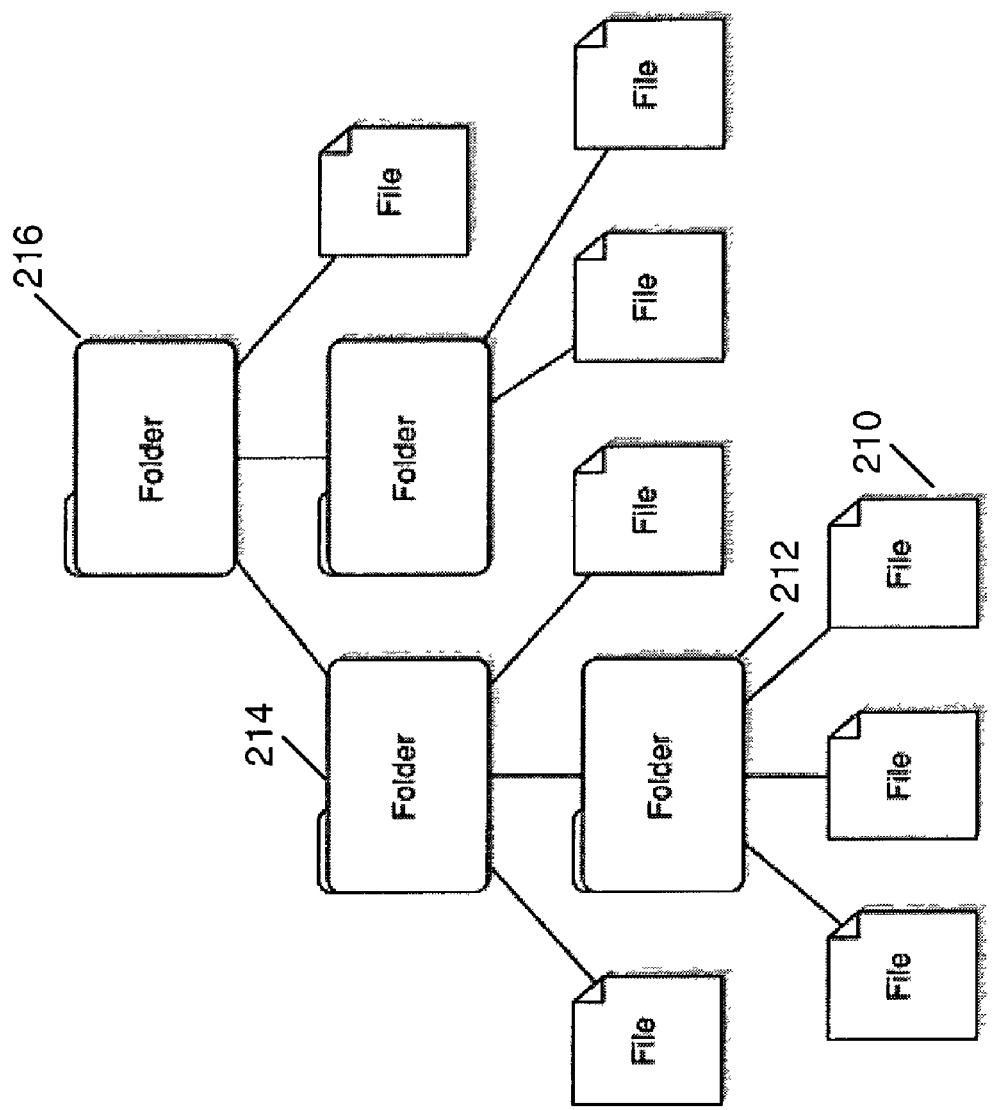
FIG. 2 is a simplified block diagram of a hierarchical file system.

FIG. 2 is a simplified block diagram of a hierarchical file system. Most personal computer users of the Linux and Windows operating systems are familiar with the files 210 within folders 212 within folders 214 within folders 216. Access to a file may be given by drilling down the file hierarchy using a graphical user interface or by entering the path name such as diskdrive:/foldername1/foldername2/foldername3 . . . filename.fileextension, e.g., c:/download/pictures/birthdayparties/babiesfirstbirthday.bmp. Hierarchical file systems usually use ASCII to represent and store characters.

Figure 3:
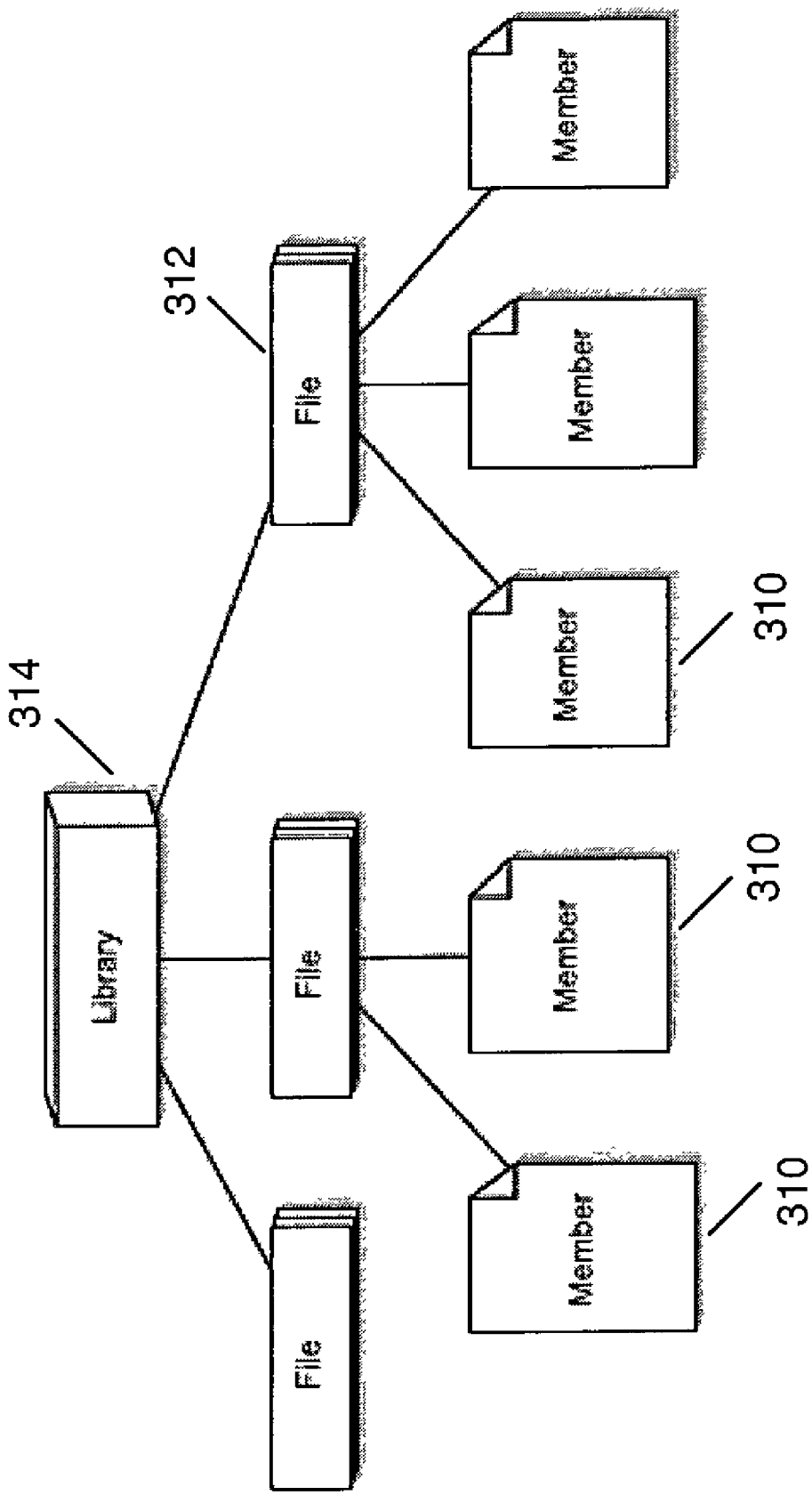
FIG. 3 is a simplified block diagram of a nonhierarchical file system.

FIG. 3 is a simplified block diagram of a nonhierarchical file system, such as the OS/390 and/or OS/400. The nonhierarchical file system is actually a limited fixed hierarchy wherein each layer of the hierarchy contains objects of the same type. Each type has its own kind of metadata. Data is stored in members 310, members 310 are within files 312, files 312 are within libraries 314. Hierarchical file systems may use EBCDIC to represent and store characters. To compensate for the limited hierarchy, a user may customize the level using a source physical file storing the file's metadata. The metadata includes the length of the source files stored in the file, the CCSID that defines the language of the source files, and the permissions.

Figure 4:
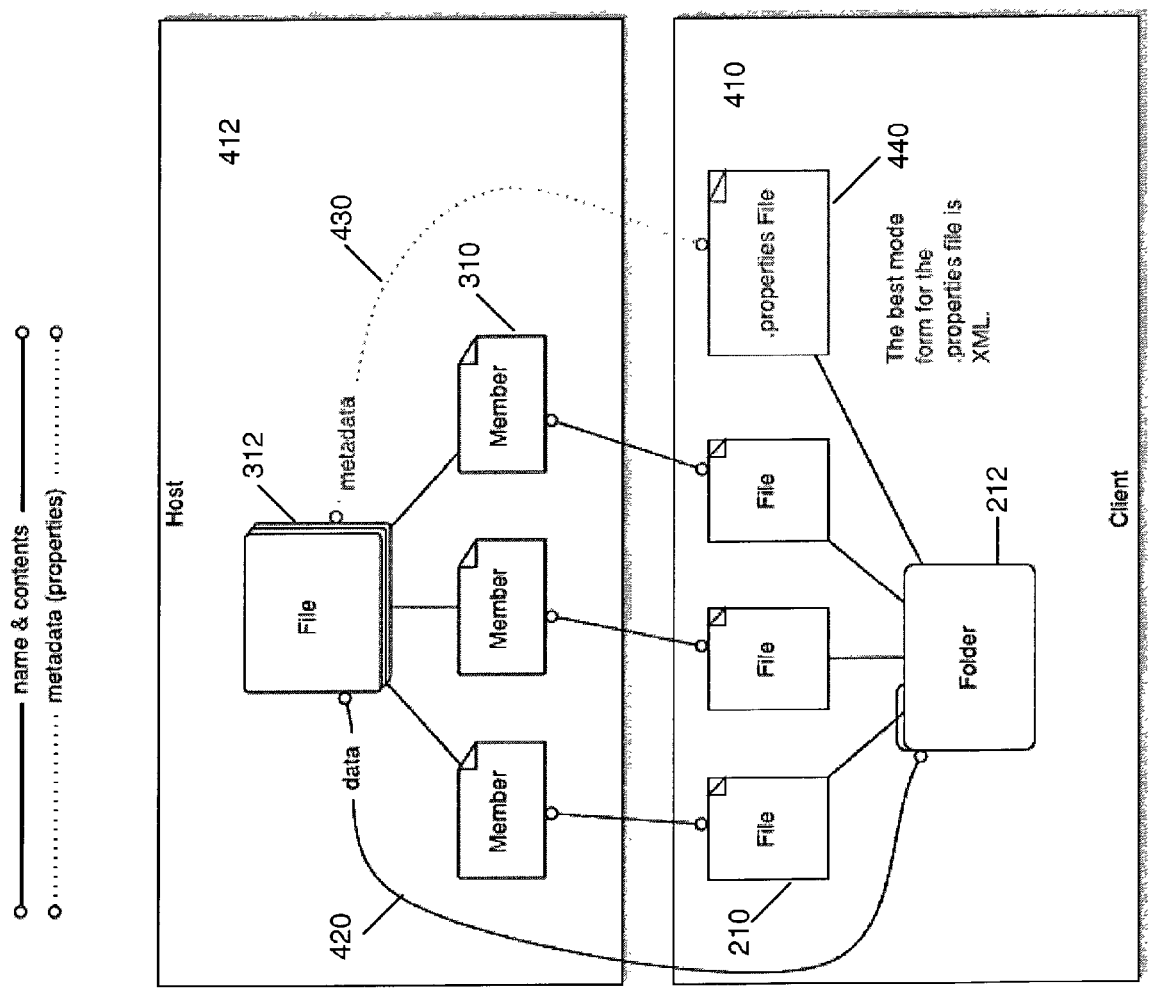
FIG. 4 is a simplified block diagram of the relationship of data within the disparate file systems of FIGS. 2 and 3.

FIG. 4 is a simplified block diagram of how data can be transferred between a host system 412 having a nonhierarchical file system of files 312 and members 310 as in FIG. 3 and a client system 410 having a hierarchical file system as in FIG. 2. Note that the solid lines 420 represent data and essential metadata as discussed earlier, specifically the data and the file identifier. The dotted lines represent metadata accompanying the data and which may be needed to understand and/or interpret the data, e.g., permissions, CCSID, dates, etc. Recall also that it is the metadata that is used by the operating systems to interpret the data itself; therefore the metadata of members 310 in a host nonhierarchical file system 412 must be read and understood by the operating system of the hierarchical file system 410 for accurate transfer and use of the data. Likewise, the metadata of the files 210 in the client system 410 having a hierarchical file system must be available and interpretable to the host operating system with its nonhierarchical file structure 412. It is this invention that allows for the accurate use of the metadata which allows data to freely transfer between operating systems, computer and human languages, and file structures.

The metadata of the data from the first operating system, generally the host system having a nonhierarchical file system, is extracted and is stored in a properties file 440, generally on a second operating system having a file system different from the host system 412. Keep in mind that the file and metadata interpretation can go either way, i.e., the properties file 440 for the metadata of the files 210 may be stored on the host system 412 or may be stored on an entirely different computer accessible by both operating systems. Further, while only two such operating systems are illustrated, the storage and translation of the properties file 440 having the metadata may be used by many different systems simultaneously, especially in a networked computer development environment.

It is particularly useful is the metadata properties or attributes not used as a file identifier are stored in XML format. The use of XML and the properties file allows the metadata of a host system file to be preserved in a source form when placing resources into a repository for sharing among team members across a network, such as the Internet. If the properties are fixed they can be specified in the following form: <property-list> <properties property1=value 1 property2=value2 1> <property-list>. If the number of properties is not fixed, they can be listed in the form: <propertylist> <property name=property-name value=property-value 1> </property-list>. Other formats could also be used to store the metadata in the .properties file, e.g., a word processing file, or another programming language so long at the file is accessible and interpretable by the second file system.

Figure 5:
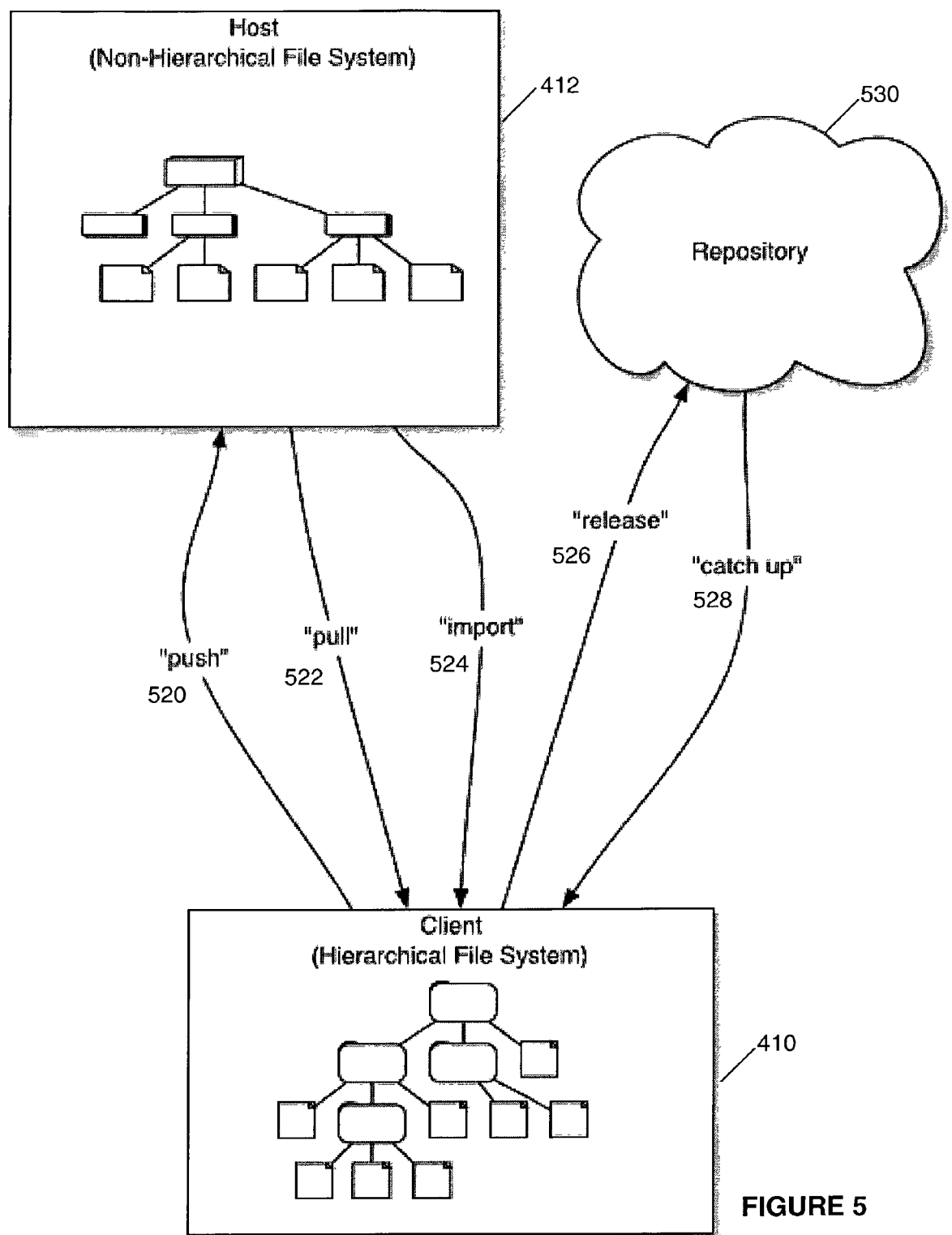
FIG. 5 is a simplified block diagram of the how resources on a nonhierarchical file system can be recreated on a hierarchical file system. It is suggested that FIG. 5 be printed on the face of the patent.

FIG. 5 is a simplified block diagram of the relationship between a hierarchical file system 410, typically the client, and a nonhierarchical file system 412, typically the host or the server. Several functions are defined for interactions of data between the two file systems. A push operation 520 makes the structure on the host system 412 mirror the project structure on the client system 410. A pull operation 522 makes the project structure on the client system 410 mirror the structure on a host system 412. An import operation 524 adds files and members from an arbitrary location on a host system 412 to a set of folders and files on a client system 410. A release operation 526 places all changes made on the client 410 into a repository 530 controlled by the software configuration management function. A catch up operation 528 places all changes that have been made in a repository 530 by other team members onto a client system 410. The repository 530 of the software configuration management may be situated on the host 412 or the client 410 or on another computer connected to a network to which the host 412 and the client 410 are also connected.

Figure 6:
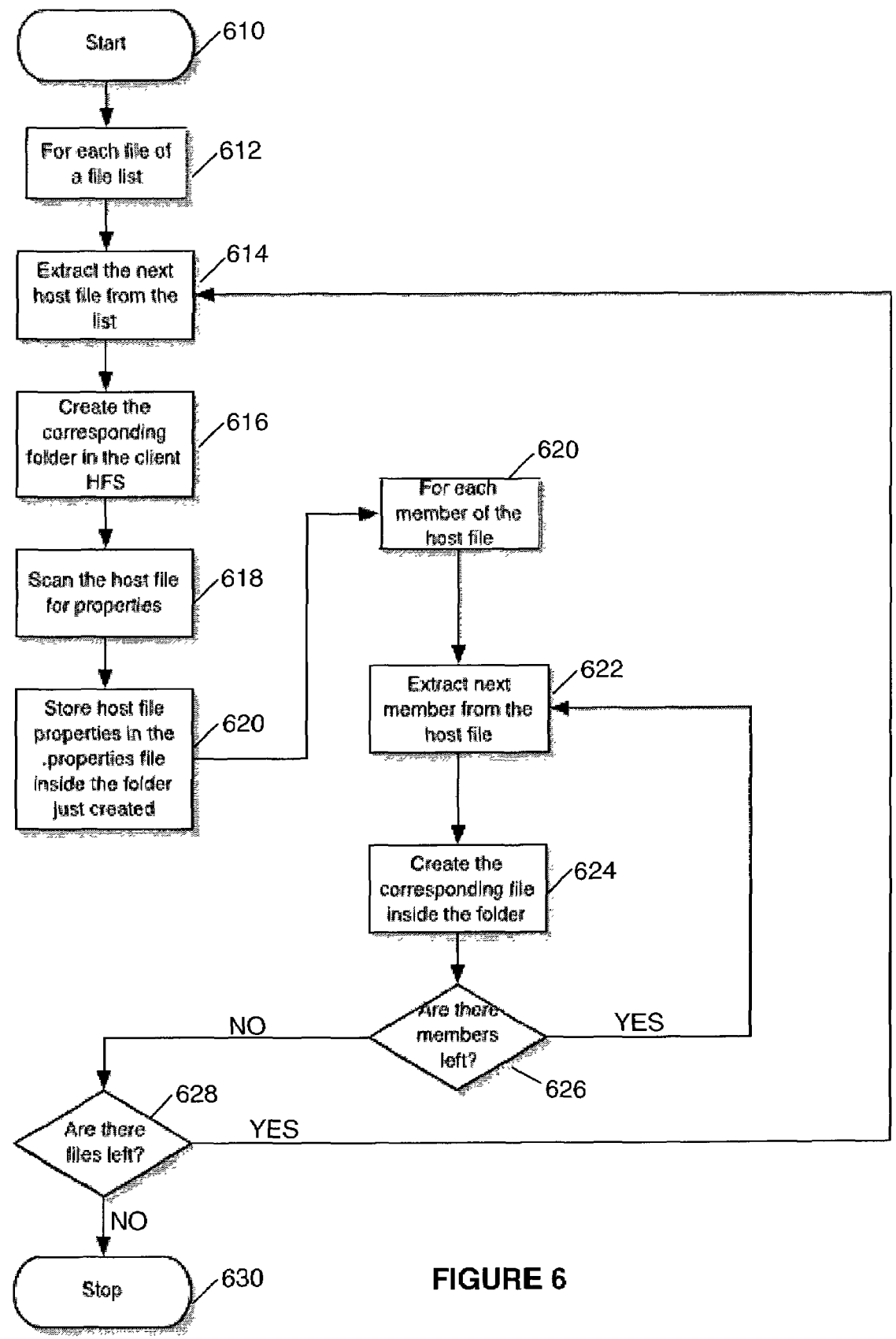
FIG. 6 is a simplified flow chart of a method for recreating resources on a client system from a host system wherein the host and client systems have different file system hierarchies.

FIG. 6 is a simplified flow chart of a method for creating corresponding resources on a computer having an operating system with a hierarchical file system from a host system having an operating system with a nonhierarchical file system. In step 610, the process begins and in step 612 a file list is established. In step 614, a host file is extracted and across the network, a corresponding folder is created in the client hierarchical file system as in step 616. Metadata from the host file is obtained in step 618 and the metadata is stored in a properties file in the corresponding folder just created on the hierarchical file system in step 620. Thus, using this mechanism, a file created by one operating system and that resided on a one kind of file system can be recreated in a different operating system having a different file system. The file then is available to and can be edited and otherwise manipulated by all the tools, applications, etc, on the second operating system. If, the edited data then is to be returned to the first operating system, posed here as having a nonhierarchical file system, the process is described with respect to FIG. 7.

Figure 7:
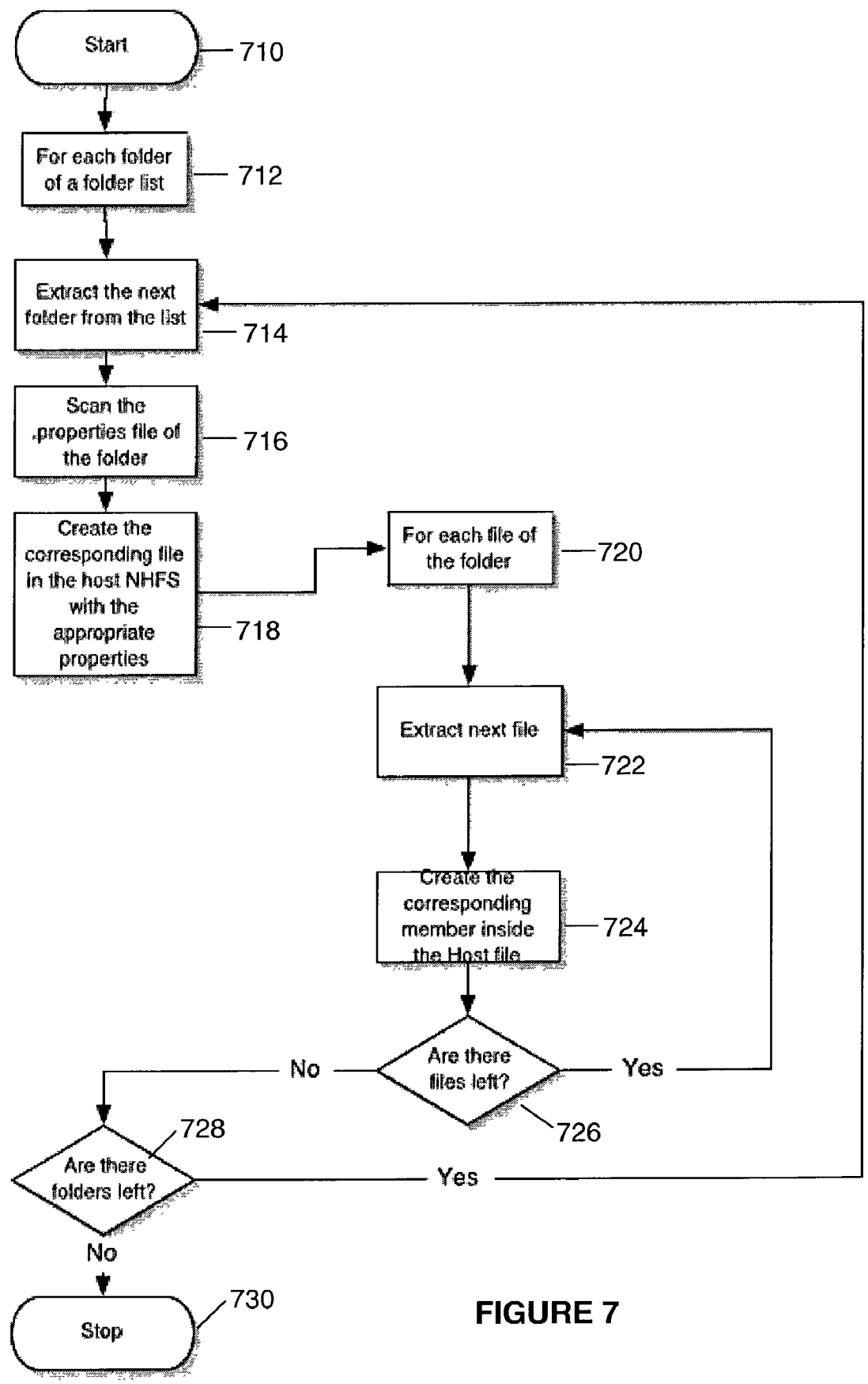
FIG. 7 is a simplified flow chart of a method for recreating resources on a host system from a client system wherein the host and client systems have different file system hierarchies.

FIG. 7 starts at 710 and for each folder on a folder list, as in step 712, a folder is extracted in step 714. The .properties file of that folder is scanned in step 716 and using the metadata information in the scanned .properties file, the corresponding file is created in a second operating system having, for example, a nonhierarchical file system, as in step 718. In step 720, the next file of the hierarchical file system is read and extracted (step 722) and a corresponding member is created in the file of the nonhierarchical host system as in step 724. If there are additional files in the folder on the hierarchical system, as determined by step 726, then that file is read and a corresponding member is created on the nonhierarchical file system. If, however, there are no more files in the folder, the next folder is examined as in step 728 to determine if there are files from which members are to be created through the process. If not, the process stops at step 730.

This invention is particularly useful using an integrated development environment, such as Eclipse, on a client workstation which may have an operating system with a hierarchical file structure. Thus, using Eclipse on a Linux machine, a software developer or a tool writer can bring down resources from an iSeries or a zSeries server/mainframe machine, modify those resources on the workstation and then put the modification back onto the server/mainframe. No manual action is required by the user to transfer files between the client and the workstation. The use of the datastore architecture, automatic codepage conversion of files between the client workstation and the server and allowing users to specify whether files of a certain type are to be treated as text or binary, provides an integrated and flexible solution to the user's needs. Note, that the invention is not limited to transfer of files from a nonhierarchical file system to a hierarchical file system; the transfer and modification of resources may be from any platform in any language to a computer system having the same or different platform and/or the same or different language—indeed, the invention herein is applicable to any two computer systems which want to share resources wherein their metadata is not necessarily compatible and/or understandable by each other.

While various embodiments of the present invention have been described above, it should be understood that they have been presented by way of example and not limitation and that variations are possible. Thus, the breadth and scope of the present invention should not be limited by any of the above-described exemplary embodiments, but should be defined only in accordance with the following claims and their equivalents.

The embodiments of the invention in which an exclusive property or privilege is claimed are defined as follows:

1. A method to transfer data from a first computer to a second computer, the first and second computer having disparate file structures, each of the file structures characterized by its metadata, the method comprising the steps of:
   (1) listing a data structure of the data to be transferred from the first computer;
   (2) scanning the metadata of the data structure to be transferred;
   (3) storing the metadata in a .properties file;
   (4) creating a corresponding data structure of the data structure in the second computer;
   (5) translating the metadata in the .properties file to corresponding metadata in the second computer;
   (6) transferring the data; and
   (7) converting the data in the data structure of the first computer to a usable format in the corresponding data structure in the second computer using the corresponding metadata.

2. The method of claim 1, wherein the data structure of the first computer is a file in a nonhierarchical file system and the data is within at least one member of the file, and the corresponding data structure in the second computer is a folder and the transferred data is in a file, the second computer having a hierarchical file structure.

3. The method of claim 1, wherein the data structure of the first computer is a folder and the data is within at least one file, the first computer having a hierarchical file structure, and the corresponding data structure in the second computer is a file and the transferred data is in a member, the second computer having a nonhierarchical file structure.

4. The method of claim 1, wherein the data structure of the first computer is different than the corresponding data structure in the second computer, the metadata representing the differences in the data structures.

5. The method of claim 4, wherein the first computer has a hierarchical file structure, and the second computer has a hierarchical file structure.

6. The method of claim 4, wherein the first computer has a nonhierarchical file structure, and the second computer has a nonhierarchical file structure.

7. The method of claim 1, wherein the files of a folder in a hierarchical file structure have the same values of metadata.

8. The method of claim 1, wherein the members of a file in a nonhierarchical file structure have the same values of metadata.

9. The method of claim 1, wherein the .properties file is located on a third computer connected to a network to which the first and the second computers are connected.

10. The method of claim 1, wherein the metadata includes at least one of the following: binary code format, human language, computer language, permissions, dates.

11. The method of claim 1, wherein the hierarchical file system is on a Linux operating system.

12. The method of claim 1, wherein the hierarchical file system is on a Windows operating system.

13. The method of claim 1, wherein the nonhierarchical file system is on an OS/400 operating system.

14. The method of claim 1, wherein the nonhierarchical file system is on an a OS/390 operating system.

15. The method of claim 1, wherein the data is pushed, pulled, imported, released, and/or caught up between the first computer and the second computer across a network.

* * * * *

UNITED STATES PATENT AND TRADEMARK OFFICE
CERTIFICATE OF CORRECTION

PATENT NO. : 7,617,222 B2 Page 1 of 1
APPLICATION NO. : 10/286560
DATED : November 10, 2009
INVENTOR(S) : Coulthard et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1823 days.

Signed and Sealed this

Nineteenth Day of October, 2010

David J. Kappos
*Director of the United States Patent and Trademark Office*